United States Patent
Feng et al.

(10) Patent No.: US 12,421,934 B2
(45) Date of Patent: Sep. 23, 2025

(54) WIND TURBINE BLADE WITH IMPROVED TRAILING EDGE STRUCTURE AND MANUFACTURING METHOD THEREOF

(71) Applicant: ZHUZHOU TIMES NEW MATERIAL TECHNOLOGY CO., LTD., Zhuzhou (CN)

(72) Inventors: Xuebin Feng, Zhuzhou (CN); Binbin Hou, Zhuzhou (CN); Hang Deng, Zhuzhou (CN); Jiehua Hu, Zhuzhou (CN); Jiangang Zhao, Zhuzhou (CN); Jun Yang, Zhuzhou (CN); Chaoyi Peng, Zhuzhou (CN); Sheng Fan, Zhuzhou (CN); Penghui Liu, Zhuzhou (CN)

(73) Assignee: ZHUZHOU TIMES NEW MATERIAL TECHNOLOGY CO., LTD., Zhuzhou (CN)

( * ) Notice: Subject to any disclaimer, the term of this patent is extended or adjusted under 35 U.S.C. 154(b) by 0 days.

(21) Appl. No.: 18/264,227

(22) PCT Filed: Oct. 11, 2021

(86) PCT No.: PCT/CN2021/122969
§ 371 (c)(1),
(2) Date: Aug. 3, 2023

(87) PCT Pub. No.: WO2023/029150
PCT Pub. Date: Mar. 9, 2023

(65) Prior Publication Data
US 2024/0035441 A1    Feb. 1, 2024

(30) Foreign Application Priority Data
Aug. 31, 2021 (CN) .......................... 202111014885.7

(51) Int. Cl.
*F03D 1/06* (2006.01)
*B29C 65/48* (2006.01)
(Continued)

(52) U.S. Cl.
CPC ............ *F03D 1/069* (2023.08); *B29C 65/481* (2013.01); *B29C 65/50* (2013.01); *B29C 65/5007* (2013.01);
(Continued)

(58) Field of Classification Search
CPC .... F03D 1/0633; F03D 1/0641; F03D 1/0643; F03D 1/0645; F03D 1/0675;
(Continued)

(56) References Cited

U.S. PATENT DOCUMENTS

| 9,739,260 B2* | 8/2017 | Garm ..................... F03D 1/0675 |
| 2011/0142668 A1* | 6/2011 | Rao ........................ F03D 1/0675 |
| | | 416/232 |

(Continued)

FOREIGN PATENT DOCUMENTS

| CN | 101769229 A | 7/2010 |
| CN | 103527397 A | 1/2014 |

(Continued)

*Primary Examiner* — Binh Q Tran
(74) *Attorney, Agent, or Firm* — Nitin Kaushik

(57) ABSTRACT

The present disclosure provides a wind turbine blade with an improved trailing edge structure and a manufacturing method thereof. The wind turbine blade includes an upper shell, a lower shell, and a trailing edge, where a trailing edge bonding region enclosed by the upper shell, the lower shell and the trailing edge is filled with composite materials, and the composite materials are discontinuous in an airfoil chordwise direction. The manufacturing method includes the following steps: S1: manufacturing reinforcements with a same cross-sectional shape as the trailing edge filling region for composite materials; and S2: integrally molding (Continued)

the reinforcements, a fiber fabric and the upper shell, providing the lower shell, combining the upper shell and the lower shell, and performing heating for curing and molding. The discontinuous filling structure reduces usages of the adhesive and the reinforcements of the composite materials. The small web can improve a strength of the trailing edge region, and reduce a bonding width of the trailing edge. Therefore, the present disclosure realizes a light weight of the wind turbine blade.

6 Claims, 9 Drawing Sheets

(51) Int. Cl.
  *B29C 65/50* (2006.01)
  *B29C 65/52* (2006.01)
  *B29C 65/54* (2006.01)
(52) U.S. Cl.
  CPC .............. *B29C 65/52* (2013.01); *B29C 65/54* (2013.01); *F03D 1/0643* (2023.08); *F03D 1/0645* (2023.08); *F05B 2230/20* (2013.01); *F05B 2230/22* (2013.01); *F05B 2230/23* (2013.01); *F05B 2230/236* (2013.01); *F05B 2230/40* (2013.01); *F05B 2240/304* (2020.08); *F05B 2240/3042* (2020.08); *F05B 2280/40* (2013.01); *F05B 2280/6003* (2013.01); *F05B 2280/6012* (2013.01); *F05B 2280/6013* (2013.01); *F05B 2280/6015* (2013.01); *F05B 2280/702* (2013.01)
(58) Field of Classification Search
  CPC ...... F03D 1/0677; F03D 1/0688; F03D 1/069; F03D 80/00; F05B 2230/20; F05B 2230/22; F05B 2230/23; F05B 2230/236; F05B 2230/40; F05B 2240/304; F05B 2240/3042; F05B 2280/40; F05B 2280/4005; F05B 2280/4006; F05B 2280/4009; F05B 2280/6003; F05B 2280/6012; F05B 2280/6013; F05B 2280/6015; F05B 2280/702; B29C 65/48; B29C 65/481; B29C 65/482; B29C 65/50; B29C 65/5007; B29C 65/5014; B29C 65/5057; B29C 65/5092; B29C 65/52; B29C 65/524; B29C 65/54; B29C 65/542; B29C 65/546; B29C 66/112; B29C 66/1162; B29C 66/131; B29C 66/524; B29C 66/532; B29C 66/54; B29C 66/636; B29C 66/721; B29C 70/443; B29C 70/865; B29D 99/0028; B29D 99/0025; B29L 2031/085; Y02E 10/72; Y02P 70/50
  See application file for complete search history.

(56) References Cited

U.S. PATENT DOCUMENTS

| | | | | |
|---|---|---|---|---|
| 2011/0211969 | A1* | 9/2011 | Nies | F03D 1/0675 156/292 |
| 2011/0243751 | A1* | 10/2011 | Fritz | F03D 15/00 416/241 R |
| 2012/0141275 | A1* | 6/2012 | Hiremath | F03D 17/00 416/61 |
| 2016/0115939 | A1* | 4/2016 | Shair | F03D 1/0675 156/60 |
| 2019/0360457 | A1* | 11/2019 | Barton | F03D 1/0675 |
| 2022/0055330 | A1* | 2/2022 | Bech | B29C 66/543 |

FOREIGN PATENT DOCUMENTS

| | | |
|---|---|---|
| CN | 107073888 A | 8/2017 |
| CN | 108509663 A | 9/2018 |
| CN | 108638541 A | 10/2018 |
| WO | WO2021048407 A1 | 3/2021 |

* cited by examiner

WIND TURBINE BLADE WITH IMPROVED TRAILING EDGE STRUCTURE AND MANUFACTURING METHOD THEREOF

CROSS-REFERENCE TO RELATED APPLICATIONS

The application claims priority to Chinese patent application No. 2021110148857, filed on Aug. 31, 2021, the entire contents of which are incorporated herein by reference.

TECHNICAL FIELD

The present disclosure belongs to the technical field of wind power generation, and in particular to a wind turbine blade with an improved trailing edge structure and a manufacturing method thereof.

BACKGROUND

With growing requirements for capturing wind energy, a chord of a wind turbine blade is increasingly wide. While the blade is heavier with a center of gravity shifting toward a tip, the gravitational fatigue load and centrifugal load are increased significantly, and both the blade and turbine set are less reliable and less cost-effective. Hence, a light weight of the wind turbine blade is gradually becoming a hotspot of the blade extended design technology. In order to realize the light weight of the wind turbine blade, the existing wind turbine blade reduces two webs down to one web. Consequently, a larger chamber is formed in a trailing edge region to easily cause instability and failure of the blade.

At present, the trailing edge of the wind turbine blade is stabilized as follows: (1) Foam is filled to support the trailing edge region of the blade. However, extensive filling of the rigid foam also increases the weight of the wind turbine blade. (2) A trailing edge web is increased. Unfortunately, a trailing edge bonding region of the blade is narrow, such that the trailing edge web is provided difficultly.

Therefore, in the field of wind turbine blades, there still lacks a trailing edge structure that can reduce an overall weight of the blade and can achieve a stabilization effect.

SUMMARY

A technical problem to be solved by the present disclosure is to provide a wind turbine blade with an improved trailing edge structure and a manufacturing method thereof, to solve instability of a trailing edge and realize a light weight of the wind turbine blade, thereby overcoming the shortages and defects in the background.

In order to solve the above technical problem, the present disclosure provides the following technical solutions:

A wind turbine blade with an improved trailing edge structure includes an upper shell, a lower shell, and a trailing edge, where a region designed near the trailing edge for bonding the upper shell and the lower shell is filled with composite materials; the composite materials are distributed in a strip-like manner along a length direction of the blade; and the composite materials are arranged at intervals in an airfoil chordwise direction. The airfoil chordwise direction is as shown by an arrow a in FIG. 1.

Preferably, the composite materials each include a reinforcement and a fiber fabric covering a periphery of the reinforcement; and the reinforcement is made of one or more selected from the group consisting of foaming polyvinyl chloride (PVC), polyethylene terephthalate (PET), high performance polyurethane foam, and polymethacrylimid (PMI) foam.

Preferably, a first one of the composite materials is tightly attached to the trailing edge, and each subsequent one of the composite materials is spaced apart from a previous one of the composite material.

Preferably, the reinforcement has a same cross-sectional shape as a trailing edge bonding region.

Preferably, a web is provided in the wind turbine blade, the web and the trailing edge enclose a trailing edge chamber, and a trailing edge web is provided in the trailing edge chamber.

Preferably, a starting point of the trailing edge web along the length direction of the blade is provided in a region at 12-15% of a total length of the blade from a blade root, and an end point of the trailing edge web along the length direction of the blade is provided in a region at 57-60% of the total length of the blade from the blade root.

Preferably, a number of the composite materials arranged at intervals in the airfoil chordwise direction changes with the length direction of the blade; and a number of the composite materials arranged in a region between the trailing edge and the trailing edge web is less than a number of the composite materials arranged near a tip of the blade.

More specifically: in the region between the trailing edge and the trailing edge web, the composite materials is divided in the airfoil chordwise direction into 1-2 segments that are 50-80 mm wide and spaced apart at 80-100 mm; in the trailing edge bonding region behind the end point of the trailing edge web along the length direction of the blade, the composite materials are divided in the airfoil chordwise direction into 2-3 segments that are 50-80 mm wide and spaced apart at 80-100 mm; and the number of the composite materials in the region between the trailing edge and the trailing edge region is less than the number of the composite materials near the tip of the blade.

Since the region behind the end point of the trailing edge web is less supported, the trailing edge is more likely to become instable. A number of segments of filled foam in the region is greater than that in the region enclosed by the trailing edge web and the trailing edge. With use of a discontinuous filled structure, while the light weight is ensured, the trailing edge is more stable.

Preferably, an upper side and a lower side of the trailing edge web are respectively and transversely broadened as an upper base plate and a lower base plate, and the upper base plate and the lower base plate of the trailing edge web are respectively defined on the upper shell and lower shell.

Preferably, trailing edge auxiliary spars are respectively provided in regions of the upper shell and the lower shell for defining the upper base plate and the lower base plate of the trailing edge web, and the trailing edge auxiliary spars are made of one or more selected from the group consisting of a unidirectional fiber fabric, a fiberglass pultrusion plate or a carbon pultrusion plate.

The trailing edge auxiliary spars can improve a stiffness of the blade and form a transverse H-shaped spar structure with the trailing edge web.

Under a same technical concept, the present disclosure further provides a manufacturing method of a wind turbine blade with an improved trailing edge structure, including the following steps:

S1: designing, near a trailing edge, a trailing edge bonding region for bonding an upper shell and a lower shell, and manufacturing reinforcements with a same cross-sectional shape as the trailing edge filling region for composite materials; and S2: providing the reinforcements and a fiber fabric on the lower shell, combining the upper shell and the lower shell, performing heating, and performing resin infusion for integral curing and molding.

Preferably, the manufacturing reinforcements with a same cross-sectional shape as the trailing edge filling region for composite materials in S1 specifically includes:

a: molding the upper shell and the lower shell;

b: packaging a structural adhesive in a plastic film, and placing the plastic film into the trailing edge filling region between pre-assembled upper shell and lower shell;

c: starting a mold heating procedure, such that the structural adhesive is cured and molded to obtain a reinforcement template for the trailing edge filling region;

d: selecting, based on the overall reinforcement template and design parameters, cross sections at intervals to obtain a cross-sectional shape of the reinforcement template (namely, a chamber shape of the trailing edge filling region), and drawing multiple reinforcement profile coordinates; and e: machining multiple reinforcements according to the profile coordinates.

The plastic film for packaging the structural adhesive can prevent the cured structural adhesive from bonding with the upper shell and the lower shell together to cause hard removal and so forth.

Preferably, the manufacturing method further includes: assembling a trailing edge web with trailing edge auxiliary spars, specifically:

a: paving, on the upper shell and the lower shell, the trailing edge auxiliary spars cooperated with upper and lower sides of the trailing edge web;

b: providing the reinforcements and the fiber fabric on the lower shell;

c: bonding the trailing edge web on the corresponding trailing edge auxiliary spar of the lower shell; and d: combining the upper shell and the lower shell, performing heating, and performing resin infusion for integral curing and molding.

Preferably, to bond the trailing edge web on the lower shell, a bonding gap between the trailing edge web and the trailing edge auxiliary spar is ensured.

Preferably, the bonding gap is specifically ensured by paving a spacer every 2-4 m.

The paved spacer can provide the bonding gap, such that upper and lower base plates of the trailing edge web are fixed on the trailing edge auxiliary spars; and meanwhile, a gap for filling the structural adhesive can be reserved for curing and molding in combination.

Compared with the prior art, the present disclosure has the following beneficial effects:

(1) The composite materials filled in the trailing edge bonding region is discontinuous in the airfoil chordwise direction, which not only provides a support for the trailing edge filling region and makes the trailing edge structure more stable, but also reduces usages of the adhesive and reinforcements of the composite materials and realizes a light weight of the wind turbine blade. The composite materials are filled flexibly. A segment of the composite material can be increased in the region without the trailing edge web, so as to improve stability of the trailing region of the blade.

(2) With the small web in the trailing edge region, the strength of the trailing edge region can be improved, thereby reducing a bonding width of the trailing edge and realizing the light weight of the blade.

(3) The lower web is provided with the upper and lower base plates, and the trailing edge auxiliary spars are provided on the upper and lower shells and corresponding to the upper and lower base plates. As a result, the lower web can be stably provided in the narrow trailing edge region, and the trailing edge structure is more stable.

(4) Methods for manufacturing the trailing edge filling structure and the small web structure are simple. Therefore, the present disclosure realizes the stability and light weight of the trailing edge structure, and is suitable for large-scale industrialization.

BRIEF DESCRIPTION OF DRAWINGS

To describe the technical solutions in examples of the present disclosure or in the prior art more clearly, the accompanying drawings required for describing the examples or the prior art will be briefly described below. Apparently, the accompanying drawings in the following description show some examples of the present disclosure, and a person of ordinary skill in the art may still derive other drawings from these accompanying drawings without creative efforts.

In the figures: 1. upper shell, 2. lower shell, 3. composite material, 4. trailing edge web, 5. web, 7. trailing edge, 9. trailing edge bonding region, 31. fiber fabric, 32. reinforcement, 41. starting point, 42. end point, 43. upper base plate, 44. lower base plate, and 45. trailing edge auxiliary spar.

DETAILED DESCRIPTION OF THE EMBODIMENTS

In order to facilitate the understanding of the present disclosure, the present disclosure is described in detail below in conjunction with the accompanying drawings of the specification and the preferred examples, but the protection scope of the present disclosure is not limited to the following specific examples.

Unless otherwise defined, all technical terms used hereinafter have the same meaning as commonly understood by those skilled in the art. The technical terms used herein are merely for the purpose of describing specific examples, and are not intended to limit the protection scope of the present disclosure.

Unless otherwise specified, various raw materials, reagents, instruments, equipment, and the like used in the present disclosure can be purchased from the market or can be prepared by existing methods.

Embodiment 1

Figure 1:
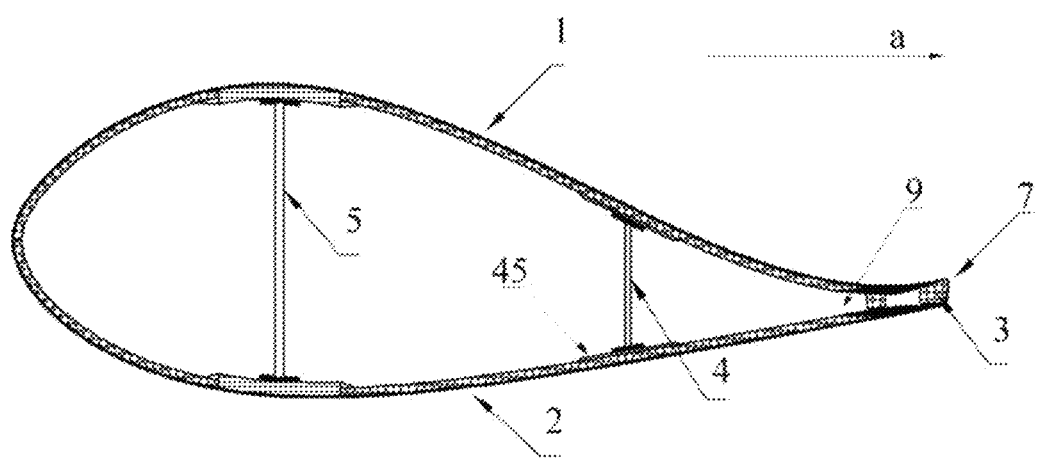
FIG. 1 illustrates an overall cross section of a trailing edge structure with a trailing edge web region for a wind turbine blade according to Embodiment 1.
Figure 2:
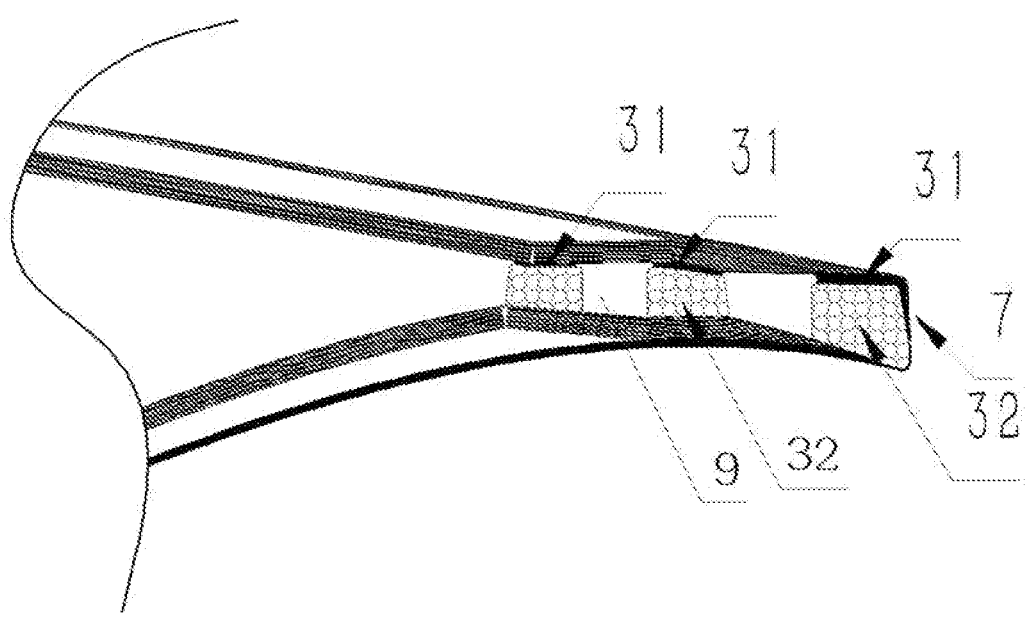
FIG. 2 illustrates a cross section of a filling structure of a trailing edge bonding region behind an end point of a trailing edge web along a length direction of a wind turbine blade according to Embodiment 1.
Figure 3:
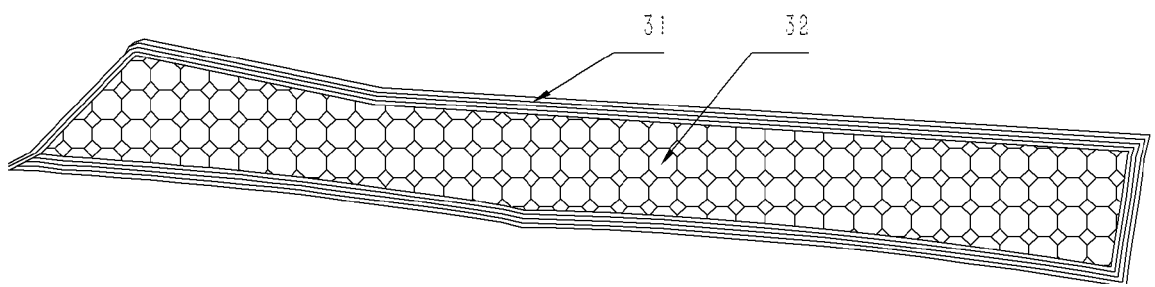
FIG. 3 illustrates a cross section of a composite material according to Embodiment 1.

As shown in FIG. 2 and FIG. 3, a wind turbine blade with an improved trailing edge structure includes an upper shell 1, a lower shell 2, and a trailing edge 7. A region designed near the trailing edge 7 for bonding the upper shell 1 and the lower shell 2 is filled with composite materials 3. The region is called a trailing edge bonding region 9. The composite materials 3 are distributed in a strip-like manner along a length direction of the blade. The composite materials 3 are arranged at intervals in an airfoil chordwise direction. An arrow a in FIG. 1 represents the airfoil chordwise direction.

The composite materials 3 each include a reinforcement 32 and a fiber fabric 31 covering a periphery of the reinforcement 32. The reinforcement 32 is made of one or more selected from the group consisting of foaming PVC, PET, high performance polyurethane foam, and PMI foam.

Figure 5:
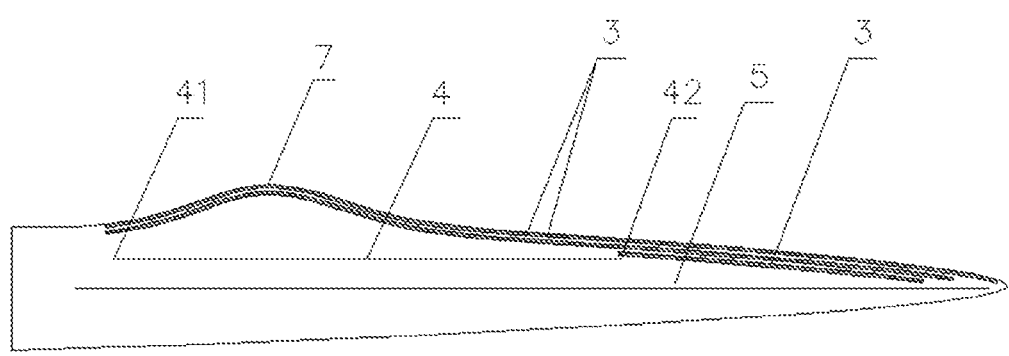
FIG. 5 is a top view of a web and a filled composite material of a wind turbine blade according to Embodiment 1.
Figure 6:
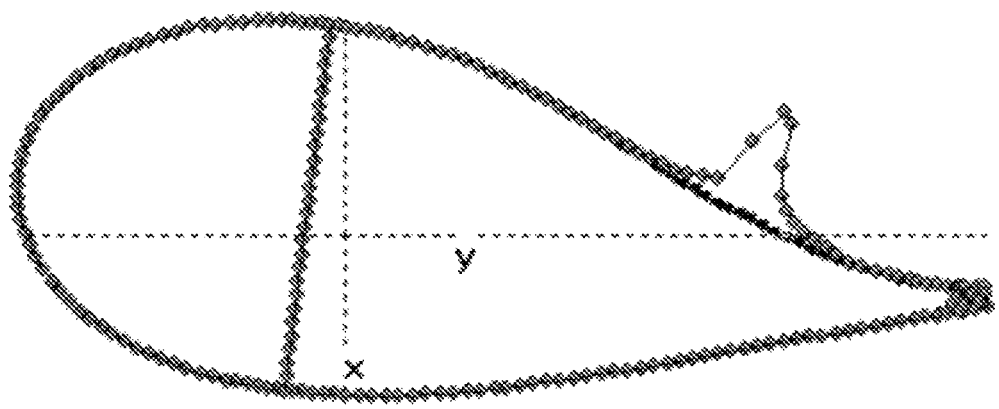
FIG. 6 is a schematic view of an instable form of a trailing edge.
Figure 7:
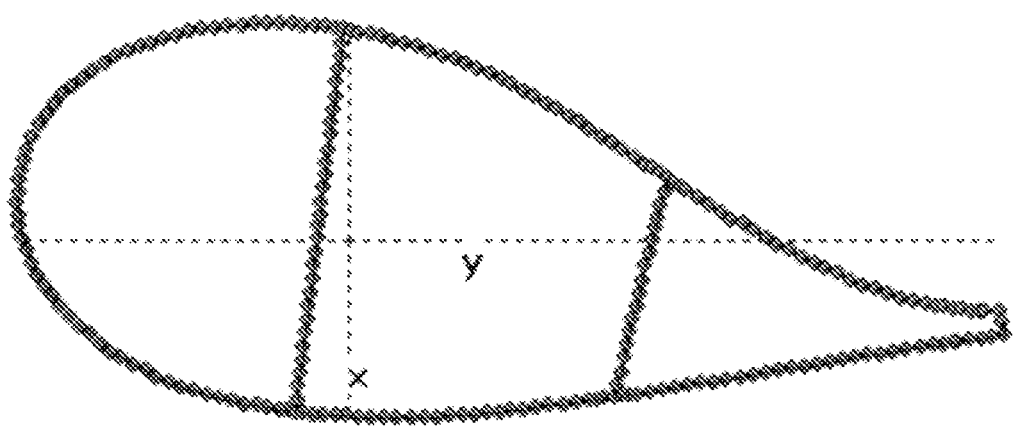
FIG. 7 is a schematic view in which a trailing edge web is increased to solve instability of a trailing edge.
Figure 8:
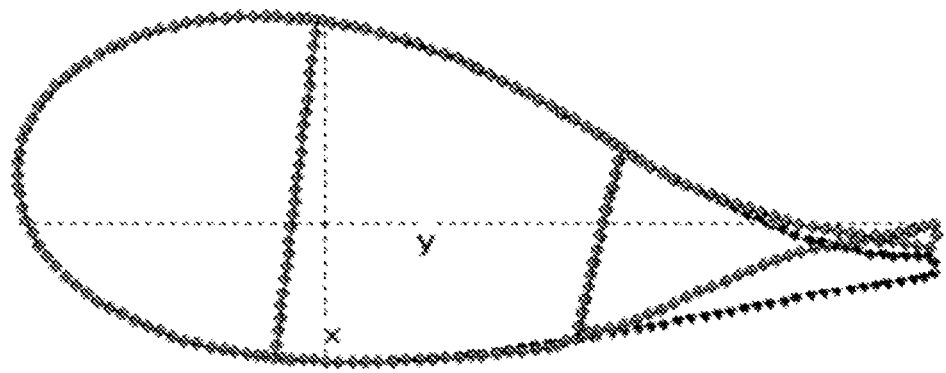
FIG. 8 is a schematic view of an instable form of a trailing edge bonding region.
Figure 9:
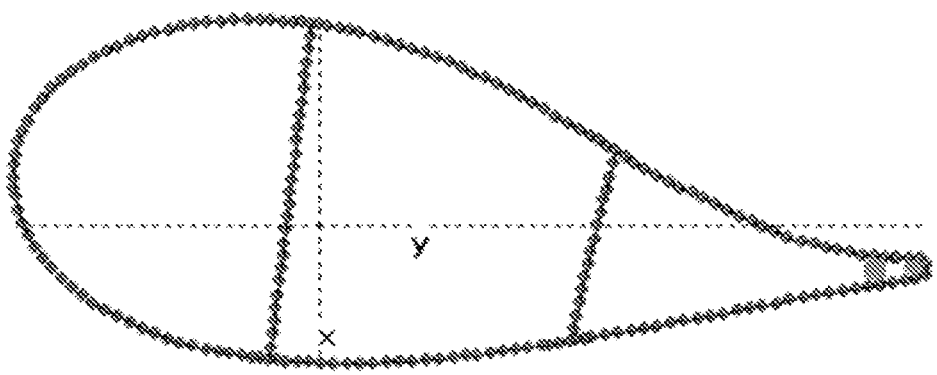
FIG. 9 is a schematic view in which a trailing edge filling structure is increased to solve instability of a trailing edge.

As shown in FIG. 1 and FIG. 5, a web 5 is provided in the wind turbine blade. The web 5 and the trailing edge 7 enclose a trailing edge chamber. A trailing edge web 4 is provided in the trailing edge chamber. A starting point 41 of the trailing edge web 4 along the length direction of the blade is provided in a region at 12-15% of a total length of the blade from a blade root. An end point 42 of the trailing edge web 4 along the length direction of the blade is provided in a region at 57-60% of the total length of the blade from the blade root.

As shown in FIG. 1 and FIG. 5, two segments of the composite material 3 are paved in the trailing edge bonding region 9. A reinforcement 32 of a first segment of the composite material 3 is tightly attached to the trailing edge 7. A second segment of the composite material 3 is spaced apart from the first segment of the composite material 3 by about 80 mm in the airfoil chordwise direction. The two segments of the composite material 3 are about 80 mm wide. As shown in FIG. 2 and FIG. 5, the trailing edge bonding region 9 is provided behind the end point 42 of the trailing edge web 4 along the length direction of the blade. There is no trailing edge web 4 in the trailing edge bonding region 9 for supporting. Hence, compared with the region enclosed by the trailing edge web 4 and the trailing edge 7, one segment of the composite material 3 is increased. The segment is 80 mm wide and spaced apart from the composite material segment 3 by about 80 mm in the airfoil chordwise direction.

Therefore, in the region enclosed by the trailing edge web 4 and the trailing edge 7, the composite materials 3 is divided in the airfoil chordwise direction into two segments are 80 mm wide and spaced apart from each other by about 80 mm. The region enclosed by the trailing edge web 4 and the trailing edge 7 refers to a region between a segment from the starting point 41 of the trailing edge web 4 along the length direction of the blade to the end point 42 of the trailing edge web along the length direction of the blade and the corresponding trailing edge 7 along the length direction of the blade. In the trailing edge bonding region 9 behind the end point 42 of the trailing edge web 4 along the length direction of the blade, the composite materials 3 are divided in the airfoil chordwise direction into three segments that are 80 mm wide and spaced apart from each other by about 80 mm.

Figure 4:
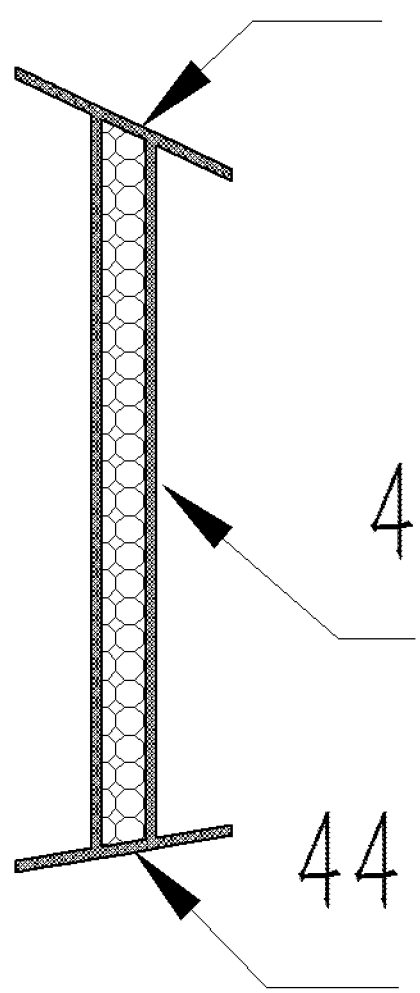
FIG. 4 illustrates a cross section of a trailing edge web according to Embodiment 1.

As shown in FIG. 4, an upper side and a lower side of the trailing edge web 4 are respectively and transversely broadened as an upper base plate 43 and a lower base plate 44. The upper base plate 43 and the lower base plate 44 of the trailing edge web 4 are respectively defined on the upper shell 1 and lower shell 2.

Trailing edge auxiliary spars 45 are provided in regions of the upper shell 1 and the lower shell 2 for defining the upper base plate 43 and the lower base plate 44 of the trailing edge web 4. The trailing edge auxiliary spars 45 are made of a unidirectional fiber fabric.

In the embodiment, a method for manufacturing a trailing edge structure of the wind turbine blade is as follows:

S1: Reinforcements 32 with a same cross-sectional shape as the trailing edge bonding region 9 for the composite materials are manufactured, specifically:

1) The upper shell 1 and the lower shell 2 are manufactured.
2) The upper shell 1 and the lower shell 2 are pre-assembled. There is no interference between the upper shell 1 and the lower shell 2.
3) A structural adhesive is packaged in a plastic film. The plastic film is placed into the trailing edge bonding region between pre-assembled upper shell 1 and lower shell 2. The upper shell 1 and the lower shell 2 are pre-assembled.
4) A mold heating procedure is started, such that the structural adhesive in the plastic film is cured and molded to obtain a reinforcement template for the trailing edge filling region.
5) Based on the overall reinforcement template and design parameters, cross sections are selected every 0.5 m to obtain a cross-sectional shape of the reinforcement template, namely, a chamber shape of the trailing edge bonding region. Coordinates of filling foam profiles of the trailing edge are drawn.
6) Multiple reinforcements 32 are machined according to the filling foam profiles of the trailing edge.

S2: The trailing edge web 4 is manufactured, specifically:
1) A spare trailing edge web 4 is obtained from a three-dimensional (3D) shape.
2) The spare trailing edge web 4 is bonded on the upper shell 1. A spacer is provided every 2 m between the upper base plate 43 and the trailing edge auxiliary spar of the spare trailing edge web 4. A bonding gap is ensured with a special pressing tool.
3) The plastic film is paved on the trailing edge auxiliary spar of the lower shell 2. The structural adhesive is coated on the lower base plate 44 of the spare trailing edge web 4.
4) A mold is closed, and the mold heating procedure is started to cure the structural adhesive.
5) The mold is opened. The spare trailing edge web 4 with cured structural adhesive is lifted out and trimmed.
6) With the spare trailing edge web 4 as a male mold, a female mold of the trailing edge web 4 is duplicated.
7) The trailing edge web 4 is obtained.

S3. The trailing edge auxiliary spars 45 cooperated with upper and lower sides of the trailing edge web 4 are respectively paved on the upper shell 1 and the lower shell 2. S4. The reinforcements 32 and the fiber fabric 31 are provided on the lower shell 2. The upper base plate 43 of the trailing edge web 4 is bonded on the corresponding trailing edge auxiliary spar 45 of the upper shell 1, and a thickness of the adhesive is ensured with the special pressing tool. The lower base plate 44 of the trailing edge web 4 is coated with the structural adhesive, and provided on the corresponding trailing edge auxiliary spar 45 of the lower shell 2.

S5: The upper shell 1 and the lower shell 2 are combined, and the mold heating procedure is started. The reinforcements 32 and the fiber fabric 31 are integrally cured and molded with the upper shell 1 and the lower shell 2 through vacuum resin infusion. The structural adhesive between the trailing edge web 4 and the trailing edge auxiliary spar 45 is cured and molded.

FIG. 6, FIG. 7, FIG. 8 and FIG. 9 are schematic views of two typical instable forms of the trailing edge and schematic views in which the trailing edge web and the trailing edge filling structure are increased to solve the instability. In the figures, action modes in which the present disclosure solves the instability of the trailing edge are shown clearly.

What is claimed is:

1. A wind turbine blade with an improved trailing edge structure, comprising an upper shell (1), a lower shell (2), and a trailing edge (7), wherein a region designed near the trailing edge (7) for bonding the upper shell (1) and the lower shell (2) is filled with composite materials (3); the composite materials (3) are distributed in a strip-like manner along a length direction of the blade; and the composite materials (3) are arranged at intervals in an airfoil chordwise direction, the composite materials (3) each comprise a reinforcement (32) and a fiber fabric (31) covering a periphery of the reinforcement (32); and the reinforcement (32) is made of one or more selected from the group consisting of foaming polyvinyl chloride (PVC), polyethylene terephthalate (PET), high performance polyurethane foam, and polymethacrylimid (PMI) foam, a first one of the composite materials (3) is tightly attached to the trailing edge (7), and each subsequent one of the composite materials (3) is spaced apart from a previous one of the composite materials (3), a web (5) is provided in the wind turbine blade, the web (5) and the trailing edge (7) enclose a trailing edge chamber, and a trailing edge web (4) is provided in the trailing edge chamber, wherein a starting point (41) of the trailing edge web (4) along the length direction of the blade is provided in a region at 12-15% of a total length of the blade from a blade root, and an end point (42) of the trailing edge web (4) along the length direction of the blade is provided in a region at 57-60% of the total length of the blade from the blade root.

2. The wind turbine blade with an improved trailing edge structure according to claim 1, wherein a number of the composite materials (3) arranged at intervals in the airfoil chordwise direction changes with the length direction of the blade; and a number of the composite materials arranged in a region between the trailing edge (7) and the trailing edge web (4) is less than a number of the composite materials arranged near a tip of the blade.

3. The wind turbine blade with an improved trailing edge structure according to claim 1, wherein a number of the composite materials (3) arranged at intervals in the airfoil chordwise direction changes with the length direction of the blade; and a number of the composite materials arranged in a region between the trailing edge (7) and the trailing edge web (4) is less than a number of the composite materials arranged near a tip of the blade.

4. The wind turbine blade with an improved trailing edge structure according to claim 1, wherein an upper side and a lower side of the trailing edge web (4) are respectively and transversely broadened as an upper base plate (43) and a lower base plate (44); and the upper base plate (43) and the lower base plate (44) of the trailing edge web (4) are respectively defined on the upper shell (1) and lower shell (2).

5. The wind turbine blade with an improved trailing edge structure according to claim 1, wherein an upper side and a lower side of the trailing edge web (4) are respectively and transversely broadened as an upper base plate (43) and a lower base plate (44); and the upper base plate (43) and the lower base plate (44) of the trailing edge web (4) are respectively defined on the upper shell (1) and lower shell (2).

6. The wind turbine blade with an improved trailing edge structure according to claim 1, wherein trailing edge auxiliary spars (45) are respectively provided in regions of the upper shell (1) and the lower shell (2) for defining the upper base plate (43) and the lower base plate (44) of the trailing edge web (4), and the trailing edge auxiliary spars (45) are made of one or more selected from the group consisting of a unidirectional fiber fabric, a fiberglass pultrusion plate or a carbon pultrusion plate.

* * * * *